Patented Nov. 22, 1927.

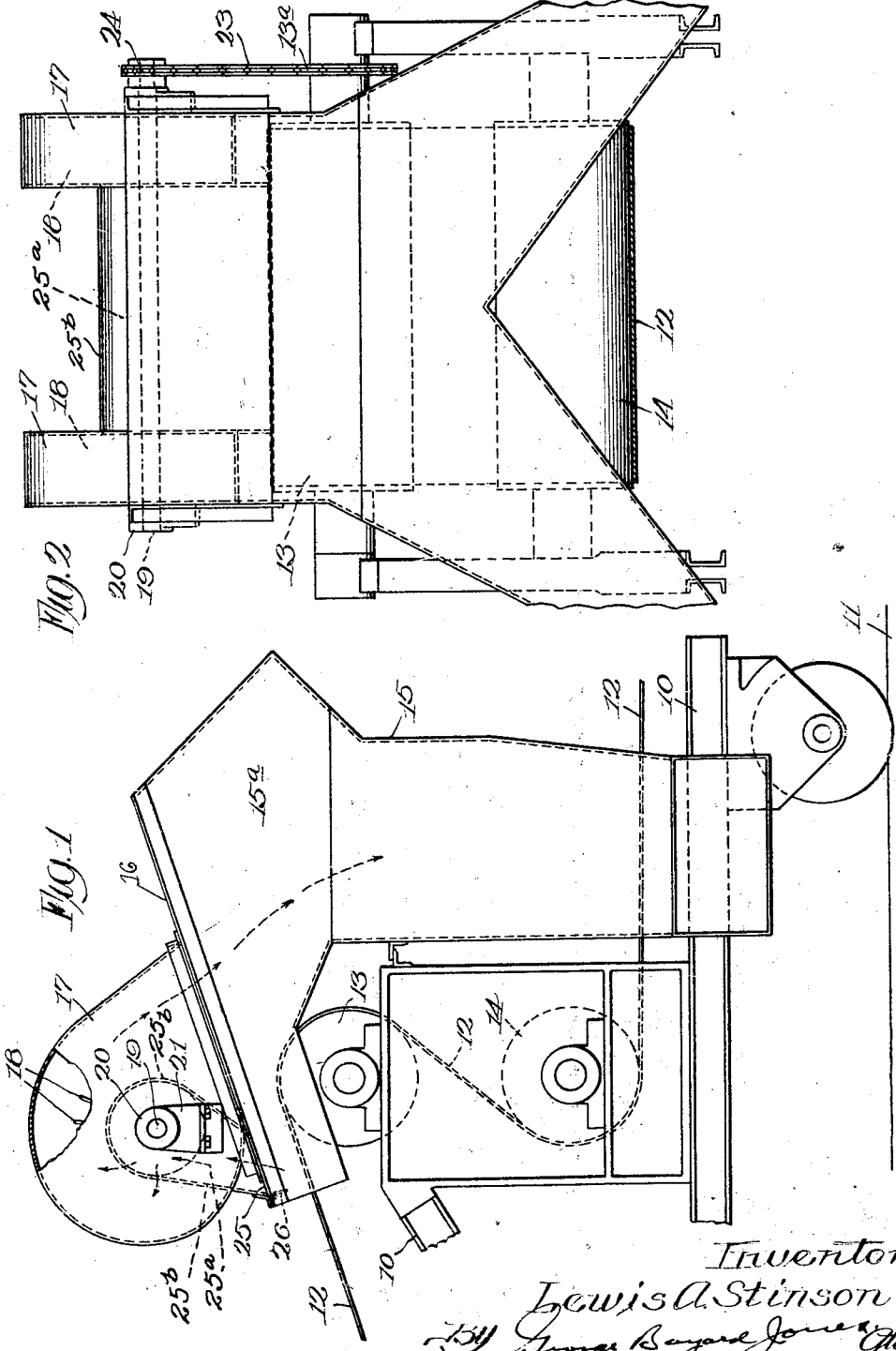

1,649,867

UNITED STATES PATENT OFFICE.

LEWIS A. STINSON, OF CHICAGO, ILLINOIS.

MATERIAL-CONVEYING APPARATUS.

Application filed January 19, 1925. Serial No. 3,225.

This invention relates to improvements in material conveying apparatus.

The principal object of the invention is to provide means for eliminating the excessive dust which arises at the point of delivery of the material from the conveyor to a delivery chute. This is accomplished by means of blowers so located as to prevent the dust carried to the delivery chute of the apparatus from flowing backwardly through the inlet thereof, and which draws the dust upwardly through the blower and then assists in discharging the same through the delivery chute, or other outlet.

Conveying apparatus of the type now commonly in use comprises an endless belt which passes over a pair of end rollers, the belt carrying the material, such as grain, which is to be discharged into bins, ships, railway cars, or other conveyances. In order that the grain may be discharged from the belt at any point intermediate the end rollers a carriage is provided which travels on tracks extending parallel with the belt, which carriage is provided with a pair of reverse lap-forming rollers over which the upper run of the belt passes. As the belt passes over the upper lap-forming roller, the grain is discharged therefrom into a delivery chute which conveys it to a boat, car, or other vehicle.

In my co-pending application, No. 612,482, filed January 13, 1923. I have disclosed a conveying apparatus of the type mentioned, which also includes a power take-off mechanism, whereby the carriage may be propelled along the track in either direction by power derived from the upper run of the conveyor.

In the present application, Fig. 1 is a side elevation showing the application of my invention to a conveyor of the type mentioned, and Fig. 2 is an end elevation thereof.

In the drawings, 10 indicates, generally, the carriage which is provided with wheels, as shown, which travel on the tracks 11 extending in a direction parallel with the conveyor belt 12, said belt extending over end rollers (not shown) and actuated from any source of power.

Suitably carried by the carriage are upper and lower reverse lap-forming rollers 13 and 14 over which the upper run of conveyor 12 passes, as shown. Also carried by the carriage is a delivery chute 15, the intake end of which preferably extends over and a short distance to the left of roller 13 and which is adapted to convey the grain discharged by belt 12 as it passes over said roller downwardly and laterally to any receptacle placed on the outside of the track, the chute dividing, as shown in Fig. 2, in order that the grain may be directed to both sides of the apparatus. Suitable means, not shown, may be provided also for directing the entire flow of grain to one side, if desired. The chute 15 has an inclined top wall 16 upon which is mounted blower casings or hoods 17, said hoods being firmly secured to the wall 16 by means of rivets or other suitable fastening means.

A pair of blower fans 18 is carried by shaft 19 which rotates in journals 20 supported by journal brackets 21, which are secured to the side wall 22 of the blower hood. The shaft of roller 13 is provided with a sprocket wheel 13$^a$ which drives chain 23 passing over sprocket wheel 24 carried on the end of shaft 19 whereby the blower is actuated.

An aperture 25 is provided in the top wall 16 of the chute 15 near the intake end thereof, said opening communicating with the chamber 25$^a$ formed by wall 25$^b$ disposed between fans 18, from the ends of which chamber the dust is drawn into hoods 17 by said fans. The wall of chute 15, opposite the intake, is of angular construction, as shown. As the grain is discharged from the rapidly moving belt, it is thrown into, and against the rear wall of, the enlarged chamber 15$^a$ and drops substantially vertically through the chute until deflected by the lower distributing sections, previously mentioned. The dust which is drawn through opening 25 and which passes through the hood of the blower in the direction shown by the arrows, is directed downwardly into the chamber 15$^a$, through the chute by the force of the blower and by the grain falling upon the dust from the upper enlarged portion of the chute. The angular walls mentioned against which at least part of the grain is thrown serves to direct the grain from above upon the incoming dust stream, and materially assists in maintaining the flow of dust downwardly through the chute.

A baffle 26 is attached to the intake end of the chute, preferably just forwardly of opening 25, as shown. This baffle serves to increase the velocity of the air drawn in by the blower and assists in preventing the escape of the dust past opening 25.

Although I have shown a certain form of my invention for the purpose of illustration, it will be seen that it may be applied to other types of conveyors, and that other changes may be made therein without departing from the spirit of the invention, and I do not wish to be restricted to the particular modification shown, except as limited thereto by the appended claims.

What I claim is:—

1. In apparatus of the class described, a material conveying belt, a chute adapted to receive the material discharged from said belt, said chute having a downwardly extending section and a portion extending over the discharging portion of said belt, a blower casing mounted above said extending portion and having an opening coinciding with an opening in said portion, and a blower in said casing adapted to draw dust through said opening and discharge the same through said downwardly extending section.

2. In apparatus of the class described, a material conveying belt, a chute adapted to receive the material discharged from said belt, said chute having a downwardly extending section and a portion extending over the discharging portion of said belt, a blower casing mounted above said extending portion and having an opening coinciding with an opening in said portion, a baffle secured to said portion above said belt and adjacent said openings, and a blower in said casing adapted to draw dust through said opening and discharge the same through said downwardly extending section.

3. The combination with a grain conveyor belt, of a chute adapted to receive the grain discharged therefrom, said chute having a downwardly extending section and having its rear wall shaped to form an enlarged chamber into which at least part of said grain is discharged by said belt, and a blower adapted to draw dust from the intake portion of said chute and deliver the same to said downwardly extending section, said chamber being adapted to direct grain downwardly upon the dust stream delivered by said blower.

4. In apparatus of the class described, a conveyor belt, a chute, said chute having an extension overlying the discharging portion of said belt and having a wall of angular cross section opposite said extension forming an enlarged chamber in the upper end of said chute, said belt being adapted to discharge material into said chamber whence the same falls downwardly through said chute, a blower mounted above said extension and adapted to draw dust therefrom and discharge the same into said chamber, said dust being impelled downwardly from said chamber through said chute by said blower and falling grain.

5. The combination with a movable tripper provided with a discharge chute having a downwardly extending portion through which it is adapted to discharge material at any position along its path of travel, of a blower having its intake communicating with said chute adjacent the mouth of the latter and having an outlet in communication with the downwardly extending portion of said chute, whereby dust is collected from the forward portion of the chute and discharged into the downwardly extending portion thereof, said tripper and blower constituting a freely movable unit.

In testimony whereof, I have subscribed my name.

LEWIS A. STINSON.